Dec. 4, 1962     A. A. HARDING     3,067,417
VELOCITY RESPONSIVE RADIO DEVICES
Filed Oct. 5, 1956
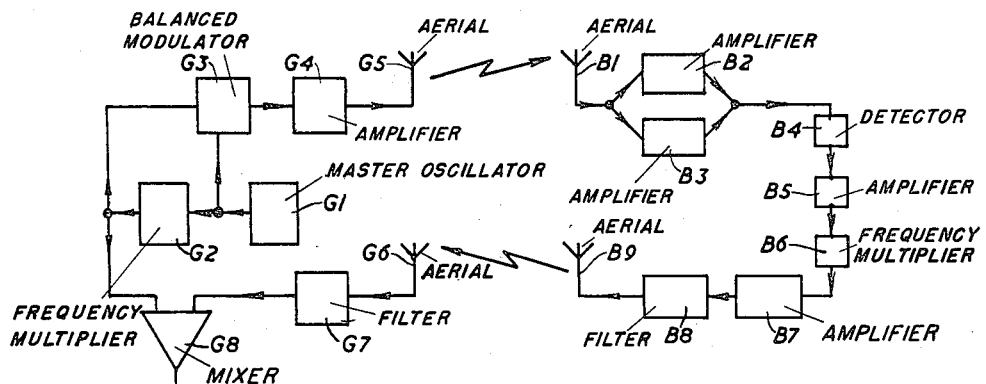
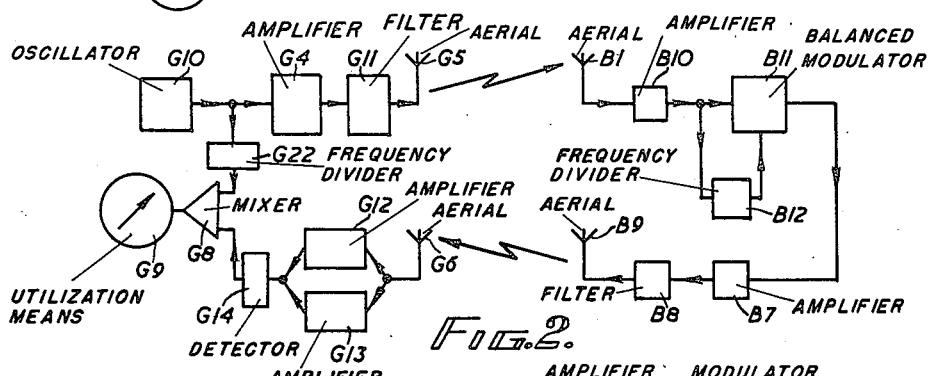
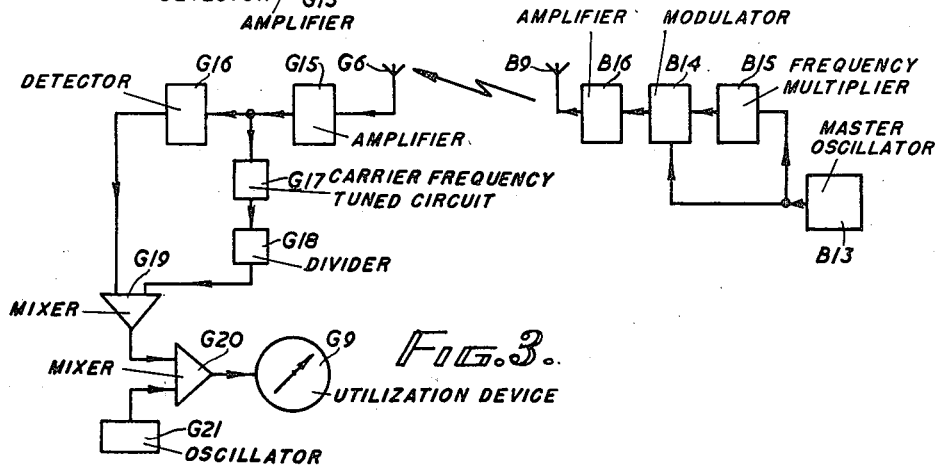
INVENTOR;
Anthony Allan Harding
BY: Baldwin & Wight
ATTORNEYS

United States Patent Office 3,067,417
Patented Dec. 4, 1962

3,067,417
VELOCITY RESPONSIVE RADIO DEVICES
Anthony Allan Harding, Essex, England, assignor to Marconi's Wireless Telegraph Company Limited, London, England, a company of Great Britain
Filed Oct. 5, 1956, Ser. No. 614,319
Claims priority, application Great Britain Dec. 21, 1955
3 Claims. (Cl. 343—8)

This invention relates to velocity responsive radio devices and more specifically to devices for measuring or otherwise responding to the velocity of bodies, such as guided missiles, travelling at great heights into the ionosphere.

For the sake of brevity in the description which follows reference will be made only to the measurement of velocity. It is to be understood, however, that the invention applies not only to measuring velocity in the sense of indicating the same, but also to measuring velocity in the sense of responding to the same in order to produce some desired control action dependent thereon whether or not the measured velocity is actually indicated.

The usual radio method of measuring the velocity of a body consists in utilising Doppler effect, i.e. transmitting a frequency across the space between said body and an observing station and measuring the Doppler shift of that frequency resulting from the movement of the body in relation to the observing station. When, however, the body is travelling in the ionosphere the known Doppler methods will not operate with the accuracy required in many cases. This is due to the fact that the velocity of propagation of radio waves in the ionosphere differs from the velocity in free space by an amount which is not constant and which, in any particular case, is not usually known. Accordingly measurement of Doppler shift as in the ordinary way does not give the velocity of a body travelling in the ionosphere until a correction dependent upon the velocity of radio wave propagation in the neighbourhood of the body is applied, and unless that velocity is known the correction obviously cannot be applied. Although the refractive index appropriate to any part of the ionosphere can be estimated from measurements made on the ground, such measurements take time to effect, and in any case such estimations are only approximate and frequently insufficiently accurate for such purposes as the control and guidance of guided missiles. Although the effects of unknown refractive indices in different parts of the ionosphere can be minimised by increasing the radio frequency employed (at very high radio frequencies the refractive index $\mu$ is given by the expression $$\mu^2 = 1 - \frac{fo^2}{f^2}$$

where $fo$ is a constant dependent on the electron density and $f$ is the frequency employed) practical considerations in many cases prevent this from being a satisfactory solution to the problem for, if accurate determination of velocity is required, the frequency used must be undesirably high. For example an accuracy of one part in 10,000 involves the use of frequencies of several thousand mc./s.

The principle of the present invention resides in taking advantage of the fact that at moderately high radio frequencies the law of variation of refractive index with frequency is such that the group and phase velocities appropriate to any one frequency differ from the value which would be obtained in free space, i.e. in vacuo, by amounts which are approximately equal and opposite. In its broadest aspect therefore the invention consists in determining velocity in terms of the sum of the fractional Doppler frequency shifts experienced by a moderately high radio frequency and a relatively low radio frequency the latter being obtained by compounding two moderately high radio frequencies. The fractional Doppler frequency shift referred to above and hereinafter is the Doppler frequency shift expressed as a fraction of the frequency experiencing such shift. Due to the law just mentioned this sum will be, to an acceptable degree of accuracy, the same for waves in the ionosphere as for waves in free space.

According to this invention a system for determining the velocity, relative to an observing station, of a body moving at high altitudes, comprises means for propagating radio waves of a plurality of adjacent very high frequencies across the varying distance separating said body from said station, and means for determining the sum of the fractional Doppler frequency shift corresponding to phase velocity and the fractional Doppler frequency shift corresponding to group velocity produced in such propagation to ascertain the relative velocity.

In one way of carrying out the invention the system comprises means, at the observing station, for transmitting two high frequency waves of pre-determined relatively close frequencies from said station to said body; means, on said body, for receiving and detecting said waves together to produce a relatively low frequency equal to the difference of the transmitted high frequencies changed by the fractional Doppler frequency shift corresponding to group velocity, means for translating said relatively low frequency to a further high frequency, and means for transmitting said further high frequency from said body; and means, also at said station, for receiving said further high frequency changed by the fractional Doppler frequency shift corresponding to phase velocity and comparing the same with a reference frequency to determine the sum of the group and phase velocity fractional Doppler frequency shifts which have occurred. In this way of carrying out the invention the two high frequency waves transmitted from the observing station are preferably obtained by frequency multiplying the output of a master oscillator and modulating the multiplied resultant by said output to produce two side bands separated by twice the oscillator frequency, while, at the body, the further high frequency is preferably obtained by frequency multiplying the relatively low frequency by a factor equal to half that used in the multiplier at the observing station, the frequency multiplied master oscillator frequency at said station being employed as the reference frequency.

In another way of carrying out the invention the system comprises means, at the observing station, for transmitting a single high frequency wave; means on said body for receiving said wave changed by the fractional Doppler frequency shift corresponding to phase velocity, translating the received wave to a relatively low frequency, modulating said receiver wave by said relatively low frequency and transmitting the two side bands resulting from said modulation; and means, also at said station, for receiving and detecting the two side bands together to produce a relatively low frequency equal to the difference between the two side bands changed by the fractional Doppler frequency shift corresponding to group velocity and comparing the same with a reference frequency to determine the sum of the group and phase velocity fractional Doppler frequency shifts which have occurred. Preferably the relatively low frequency into which the received wave is translated is obtained by subjecting said received wave to freqency division and preferably also the reference frequency is obtained by frequency dividing the single high frequency wave by a factor equal to half the factor of division used for said translation.

In a third way of carrying out the invention transmission takes place in one direction only—from the body to the observing station. In this way of carrying out the invention the system comprises means, on the body, for transmitting high frequency waves of two predetermined relatively close frequencies; and, at the observing station, means for detecting the two received waves together to produce a relatively low frequency equal to the difference of the transmitted high frequencies changed by the fractional Doppler frequency shift corresponding to group velocity, means frequency selective to the mid-frequency between the two transmitted frequencies for producing an output of said mid-frequency changed by the fractional Doppler frequency shift corresponding to phase velocity, means for translating said output to a relatively low frequency, and means for mixing the last mentioned relatively low frequency with the first mentioned relatively low frequency to produce a resultant frequency which is a measure of the sum of the group and phase velocity fractional Doppler frequency shifts which have occurred. Preferably in this way of carrying out the invention the two frequencies transmitted from the body are side band frequencies resulting from modulating a high frequency carrier with a relatively low modulating frequency and preferably also the carrier is also transmitted, though so-called suppressed carrier transmission may be used. The means selective to the mid-frequency and provided at the observing station are preferably constituted by a carrier frequency tuned circuit and preferably also the output of this circuit is translated into the relatively low frequency by a frequency divider having a factor of division equal to the ratio of the transmitted carrier to the relatively low modulating frequency. The sum of the two fractional Doppler frequency shifts is preferably measured, in this embodiment, by beating the output of the mixer mixing the two relatively low frequencies produced at the observing station with a reference oscillator of twice the low modulating frequency and utilising the resultant beat frequency output.

The invention will be further described in connection with the embodiments shown in the accompanying block diagram in which:

FIG. 1 shows one method of operating the system between the observation station on the left and the moving station on the right;

FIG. 2 shows an arrangement in which the apparatus at the two stations is interchanged;

FIG. 3 shows an arrangement wherein the transmission takes place in one direction only, i.e. from the moving body to the observing station.

In each of the three drawings there is an observing station, presumed to be a ground station, and a station carried by the moving body. Parts in the ground station are indicated by references including the letter G and parts in the moving body are indicated by references including the letter B. In describing the drawing numerical values of frequency will be given, but it is to be understood that these are by way of example only.

Referring to FIGURE 1 the ground station has a master oscillator G1 of, for example 10 mc./s., the output of which is frequency multiplied, for example by a factor of 30, by a frequency multiplier G2. The multiplied output from G2 is fed to a balanced modulator G3 of known form where it is modulated by the 10 mc./s. output from the oscillator G1. The two resultant side band frequencies, which will be of 290 and 310 mc./s., are amplified by an amplifier G4 and transmitted by an aerial G5 to the moving body.

At the moving body the transmitted waves are received by an aerial B1 and amplified in two amplifiers B2, B3 of narrow band pass type with pass bands centred respectively at 290 and 310 mc./s. The frequencies actually received by these amplifiers will, however, be shifted due to Doppler effect and will be 290 $(1+d_p)$ mc./s. and 310 $(1+d_p)$ mc./s. where $d_p$ is the fractional Doppler frequency shift corresponding to phase velocity. The outputs from the amplifiers B2 and B3 are combined and detected by a detector B4 and will consist of the difference frequency modified by the fractional Doppler frequency shift due to group velocity. The output in question will, therefore, be 20 $(1+d_g)$ mc./s. where $d_g$ is the fractional Doppler frequency shift corresponding to group velocity. This output is amplified by an amplifier B5 and multiplied by a frequency multiplier B6 having a multiplication factor of 15 i.e. half the factor of the multiplier G2. Multiplied output from B6 after amplification by an amplifier B7, is passed through a filter B8 having a pass band appropriate to the frequencies from the amplifier B7 but not wide enough to permit interference to be caused with the signals received at B1, and transmitted by an aerial B9 to the receiving aerial G6 of the observing station.

The signals picked up by aerial G6 will be of frequency 300 $(1+d_g+d_p)$ mc./s., that is to say a frequency which includes the sum of the phase and group velocity fractional Doppler shifts. This received frequency is passed through a filter G7 designed to prevent interference by signals direct from the aerial G5 and fed to a mixer G8 whose second input is taken from the frequency multiplier G2. The resultant output from the mixer G8 will be of frequency 300 $(d_p+d_g)$ mc./s. and is indicated or otherwise utilised by any frequency responsive device represented as a frequency meter G9. The reading of this meter will be a measure of the relative velocity of the body.

The modification shown in FIGURE 2 may be regarded as one in which the apparatus at the two stations of FIGURE 1 is interchanged. In FIGURE 2 the observing station has a 300 mc./s. oscillator G10 whose output is amplified by an amplifier G4 and passed through a filter G11 to a transmitting aerial G5. The receiving aerial B1 carried by the moving body feeds its output through any suitable filter (not shown) to an amplifier B10 which in turn feeds into a balanced modulator B11. The modulating input to the modulator B11 is obtained by frequency dividing the output from the amplifier B10 by a frequency divider B12 having a dividing factor of, for example, 30. It will be seen that the high frequency input to the modulator B11 will be of frequency 300 $(1+d_p)$ mc./s. This is amplified by an amplifier B7, subjected to such filtering as may be necessary by a filter B8, transmitted from aerial B9 and received at the observing station by the aerial G6. This aerial feeds into amplifiers G12 and G13 designed respectively to amplify the two side band frequencies changed by the phase velocity fractional Doppler shifts appropriate to the side band frequencies in question, namely 290 and 310 mc./s. The amplified outputs from the amplifiers G12 and G13 are fed to a common detector G14 whose output will consist of the frequency 20 $(1+d_p+d_g)$ mc./s. This output is mixed in a mixer G8 with a frequency of 20 mc./s. obtained from the oscillator G10 by means of a frequency divider G22 providing a division factor of 15 and the resultant beat frequency indicated or otherwise utilised by the utilisation means G9.

In the embodiment shown in FIGURE 3 transmission takes place in one direction only, namely from the body to the observing station. The apparatus carried by the body consists of a master oscillator B13 of, say, 10 mc./s. whose output is fed as modulating input to a modulator B14 and is also multiplied by a factor of 30 by a frequency multiplier B15 which provides the carrier input to the modulator B14. The two resultant side bands of 290 and 310 mc./s., together with the carrier of 300 mc./s., are amplified by an amplifier B16 and transmitted by the aerial B9. At the observing station the received signals are received on the aerial G6, amplified by an amplifier G15, and fed to a detector G16 whose output will consist of the frequency 10 $(1+d_g)$ mc./s. Output from the amplifier G15 is also fed to a carrier frequency tuned circuit G17 whose output will consist of the frequency 300 $(1+d_p)$. This output is divided by a frequency divider G18 having a factor of 30, i.e. the same factor as that provided by the multiplier B15. The two low frequency outputs, one from the detector G16 and the other from the frequency divider G18 are mixed in a mixer G19 whose output will accordingly consist of the frequency 10 $(2+d_p+d_g)$ mc./s. This frequency is fed to a further mixer G20 whose second input is provided by stable reference oscillator G21 of 20 mc./s. The output from this last mixer G20 will accordingly consist of the frequency 10 $(d_p+d_g)$ mc./s. and this is indicated or otherwise utilised by the utilisation device G9.

I claim:
1. A system for deriving a measure of the velocity of a body relative to an observing station, said system comprising transmitter means at said observing station for propagating a plurality of adjacent very high frequency waves across the distance separating said body from said station, receiver means at said body for receiving said propagated waves including means for deriving from said waves signals indicative of the fractional Doppler frequency shift corresponding to group velocity, transmitter means at said body for transmitting said derived signals from said body to said station and receiver means at said station for receiving said derived signals changed by the fractional Doppler frequency shift corresponding to phase velocity and means responsive to said last mentioned signals for indicating a value indicative of the relative velocity.

2. A system according to claim 1, wherein the receiving means on the moving body includes means for detecting said propagated waves together to produce a relatively lower frequency equal to the difference of the transmitted frequencies changed by the fractional Doppler frequency shift corresponding to group velocity and means for translating said relatively lower frequency to a further high frequency, said radio transmitting means including means for transmitting said further high frequency toward said observing station receiver means.

3. A system according to claim 1, wherein the two high frequency waves transmitted from the observing station are obtained by frequency multiplying the output of a master oscillator and modulating the multiplied resultant by said output to produce two side bands separated by twice the oscillator frequency and wherein the further high frequency at the moving body is obtained by frequency multiplying the relatively lower frequency by a factor equal to half that used in the multiplier at the fixed station, the frequency multiplied master oscillating frequency at said station being employed as a reference frequency.

References Cited in the file of this patent

UNITED STATES PATENTS

| | | |
|---|---|---|
| 1,750,668 | Green | Mar. 18, 1930 |
| 2,520,166 | Page | Aug. 29, 1950 |
| 2,658,195 | McConnell | Nov. 3, 1953 |
| 2,695,995 | Cauchois | Nov. 30, 1954 |